F. W. ROLLER.
ELECTRIC MEASURING INSTRUMENT.
APPLICATION FILED AUG. 5, 1916.

1,380,419.   Patented June 7, 1921.
2 SHEETS—SHEET 1.

Inventor
Frank W. Roller,
By his Attorneys
Edwards, Sager & Wooster.

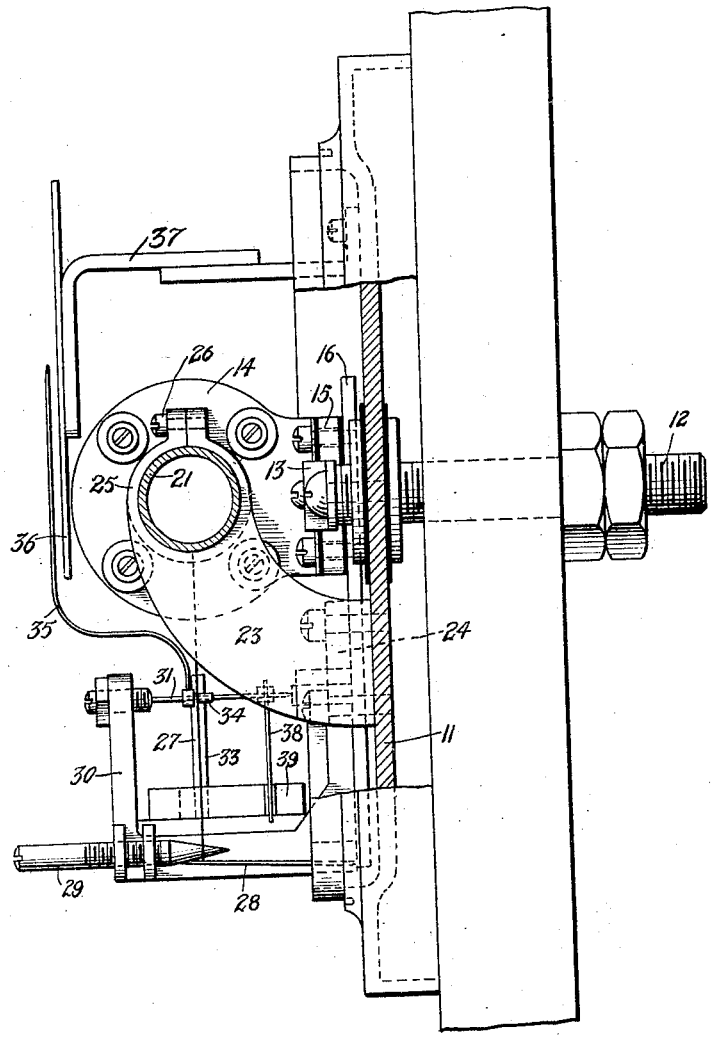

UNITED STATES PATENT OFFICE.

FRANK W. ROLLER, OF EAST ORANGE, NEW JERSEY, ASSIGNOR TO ROLLER-SMITH COMPANY, A CORPORATION OF NEW YORK.

ELECTRIC MEASURING INSTRUMENT.

1,380,419.     Specification of Letters Patent.     Patented June 7, 1921.

Application filed August 5, 1916. Serial No. 113,281.

*To all whom it may concern:*

Be it known that I, FRANK W. ROLLER, a citizen of the United States, residing at East Orange, in the county of Essex and State of New Jersey, have invented certain new and useful Improvements in Electric Measuring Instruments, of which the following is a full, clear, and exact specification.

The principal object of my invention is to provide a new and improved electrical measuring instrument of the type in which the index is actuated by the change in length of a conductor due to heating by the passage of the current therethrough. Another object of my invention is to provide an electrical measuring instrument of this type in which suitable provision is afforded to take heat from the conductor by radiation therefrom. Still another object of my invention is to provide an instrument of this type with an efficient heat absorbing body in proximity to the conductor to take heat radiated therefrom. These and other objects will be made apparent in the following specification and claims taken with the accompanying drawings, in which I have shown one specific embodiment of my invention.

Figure 1:
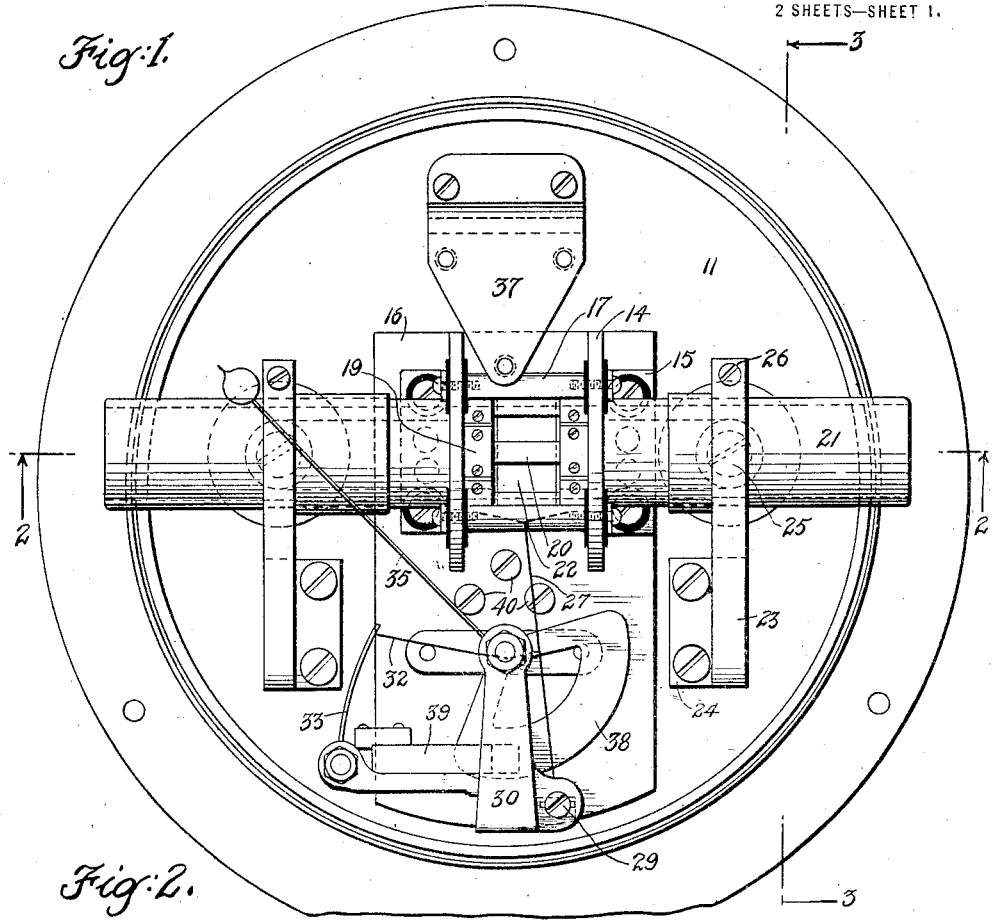

Referring to the drawings, Figure 1 is a front elevation of an instrument embodying my invention, the casing and the dial having been removed to show the essential parts more clearly.

Figure 2:
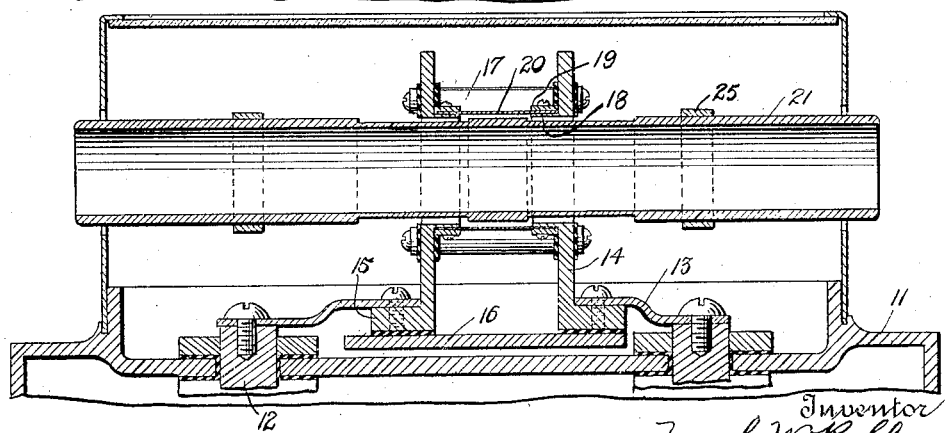

Fig. 2 is a section on the line 2—2 looking in the direction of the arrows.

Fig. 3 is a section on the line 3—3 looking in the direction of the arrows. The base plate 11 has the two conductor terminals 12 entering through insulation bushings. Secured to the inner ends of the conductors 12 are metal strips 13 attached respectively to brackets 14 by screws entering the feet 15 of said brackets. The plate 16 is supported on the base plate 11 by the screws 40, and the feet 15 of the brackets 14 are secured to the plate 11 by means of insulated screws shown in Fig. 3.

The main portion of each bracket 14 is in the shape of an annulus and the two annuli 14 are braced apart with intervening insulation by the pillars 17. Each annulus 14 has an inwardly directed flange 18 and thin conductor strips 20 have their ends secured to the flanges 18 by screws through the little clamping plates 19.

The copper tube 21 extends through the side walls of the instrument casing and through the two rings 14 as shown in Fig. 2. The outside wall 22 is blackened so as to make a good heat absorber and extends very close to the inner faces of the conductor strips 20. This copper tube 21 is supported on brackets 23, each bracket 23 having a foot 24 attached by screws to the base plate 11 and having its end in the form of a split ring 25 clamped by a screw 26 around the tube 21.

Attached to the middle point of one of the conductor strips 20 is a wire 27, the other end of which is connected to the leaf spring 28 mounted on the plate 16. The tension of the wire 27 can be adjusted by the screw pin 29 carried in screw threaded bearings on the standard 30 that is supported by the plate 16. The spindle 31 supported in suitable bearings has a small drum 34 and the wire 32 has one end connected to an intermediate point of the wire 27, then takes a turn about the drum 34 and has its other end connected to the leaf spring 33. The spindle 31 carries an index 35 adapted to coöperate with a scale on the dial 36, which is supported by a standard 37 on the base plate 11 of the instrument.

The spindle 31 also carries a vane 38 which extends between the poles of the permanent magnet 39.

It will be seen that there is a continuous conductor path between the terminals 12 through the thin metallic strips 20 in multiple. The ring brackets 14 are of light construction. An electric current flowing from one terminal 12 to the other terminal 12 through the strips 20 will heat them to a considerable extent, but the heat so generated in the strips 20 will be radiated to and absorbed by the proximate absorbing surface 22 of the copper tube 21. The wire 27 is on a constant tension which may be adjusted by means of the screw pin 29. The heating of the conductor strips 20 will correspond with the current therethrough and this heating will produce a corresponding elongation of said strips 20. Accordingly, the spring 33 will displace the wire 32 and rotate the index 35 over the scale on the dial 36, which will be graduated to indicate the current passing between the terminals 12, or some function of the current.

By employing a number of similar conductor strips 20, I am able to provide enough current carrying cross section so that outside shunts will not ordinarily be necessary. By providing means for rapidly absorbing heat radiated from the conductor strips 20, I am able to work the instrument through a considerable range of temperatures and to avoid the necessity for long conductors which have been common in the hot wire type of meters.

The impedance which a current path offers to alternating current depends somewhat on the frequency and on the configuration of the path as well as on its cross section and if a shunt is of different configuration from the main path, the proportion in which the current divides between the main path and the shunt may be different for different frequencies. In my device the current paths 20 are all alike, so that at all frequencies the thin strip 20 to which the wire 27 is attached will receive a constant proportion of the entire current between the terminals 12. The heat absorbed by the black surface 22 will be dissipated by conduction to the outside of the casing and by convection incident to the circulation of air through the tube.

By blackening the conducting strips 20, their facility to dissipate heat by radiation may be increased.

The spacer rods or pillars 17 and the rings 14 are made of material having such a coefficient of expansion that the tension on the strips 20 will be practically constant when the instrument is idle for all ordinary room temperatures. A suitable choice of materials to meet this condition will be obvious to persons skilled in the art of constructing apparatus such as herein disclosed.

The entire mechanism by which movement is transmitted from a conductor strip 20 to the index 35 is supported on the plate 16. This plate 16 is secured to the base 11 by the three screws, 40. Hence it will be seen that the relative position and adjustment of the working parts is properly maintained. The tube 20 can be slipped lengthwise out of its supporting brackets 23, and then by removing the screws in the ends of the flexible conductors 13, and also removing the screws 40, the plate 16 with the mechanism referred to, can be removed from as a unit the base 11.

I claim:—

1. In an electric measuring instrument, a pair of parallel electrically conductive rings, a plurality of thin conductor strips with their ends attached to the respective rings, a cylindrical heat absorbing body within the space inclosed by said strips, and an index controlled by the change of length of one of said conductors.

2. In an electric measuring instrument, a plurality of parallel thin conductors lying approximately along a cylindrical surface and extending parallel with the axis thereof, a cylindrical heat absorbing body with a surface thereof close to said conductors and spaced therefrom, and an index controlled by the change of length of one of said conductors.

3. In an electric measuring instrument, two parallel conductor rings braced apart by insulated pillars, a plurality of thin conductor strips with their ends attached to the respective rings, a radiant heat absorber in the shape of a cylindrical tube passing through said rings with its exterior surface close to said thin conductors and an index controlled by the change of length of one of said conductors.

4. In an electric measuring instrument, a pair of ring brackets, a support therefor, insulated pillars bracing said ring brackets apart, annular flanges on said brackets within said pillars, thin conductor strips with their ends attached to said flanges, a radiant heat absorbing cylindrical body inside the space inclosed by said thin conductors, and an index controlled by the change of length of one of said conductors.

5. In an electric measuring instrument, a pair of parallel conductor rings, a plurality of thin conductors with their ends attached to said rings, a hollow cylinder of heat conducting material within said rings with its outer surface close to said thin conductors, said surface having good heat absorbing quality, brackets supporting said cylinder without contact between the cylinder and the conductor rings or the conductor strips, and an index controlled by the change of length of one of said conductors.

6. In an electric measuring instrument, two parallel conductor rings braced apart by insulated pillars, a plurality of thin conductor strips with their ends attached to the respective rings, a radiant heat absorber in proximity to said strips and spaced therefrom, and an index controlled by the change of length of said conductor strips, said pillars and said rings being made of such materials that their resultant temperature expansion between the terminals of the strips will be equal to that of the strips themselves, whereby the tension of the strips will be unaffected by changes of room temperature.

7. In an electrical measuring instrument, a plurality of similar thin conductors connected in multiple, a massive body of good heat absorbing quality in the same relative position with respect to each of said thin conductors, said body being close to all of them but spaced therefrom and of a size and quality such that its temperature will not be substantially raised by heat received from said conductors and an index controlled by the change of length of one of said conductors.

In testimony whereof I affix my signature, in presence of two witnesses.

FRANK W. ROLLER

Witnesses:
M. W. ISREL,
GEORGE H. EDDY.